United States Patent [19]
Tanaka

[11] 3,969,764
[45] July 13, 1976

[54] COLOR TELEVISION CAMERA
[75] Inventor: Hideshi Tanaka, Yokohama, Japan
[73] Assignee: Victor Company of Japan, Limited, Yokohama, Japan
[22] Filed: Jan. 24, 1975
[21] Appl. No.: 543,929

[30] Foreign Application Priority Data
Jan. 28, 1974 Japan.............................. 49-11616

[52] U.S. Cl. ............................................... 358/47
[51] Int. Cl.² ......................................... H04N 9/07
[58] Field of Search............ 358/47, 44; 350/162 SF

[56] References Cited
UNITED STATES PATENTS
3,585,284  6/1971  Macouski...................... 350/162 SF
3,719,771  3/1973  Eto et al............................... 358/47

Primary Examiner—Robert L. Griffin
Assistant Examiner—John C. Martin

[57] ABSTRACT

A color television camera comprises a camera tube for producing chrominance signals and a color-resolving striped filter disposed in front of the camera tube. A circuit derives first, second, and third primary color signals responsive to a direct wave signal produced as output from the camera tube and produces first and second modulated color signals. The color-resolving striped filter is made up of a plurality of groups of filter stripes, each group comprising filter stripes of a plurality of kinds extending parallel to the scanning direction of the electron beam of the camera tube. The stripes are arranged in a row, in a direction perpendicular to the scanning direction. Of these groups of stripes, only one part of the stripes (of at the most one kind) is a filter for transmitting additive color mixture light. Other parts are filters for transmitting only a suitable one primary color out of the three primary color lights or opaque parts. The various filters, respectively of the stripes, are so arranged that in each stripe group, with respect to light of all colors, the first primary color light, mixed light of the first and second primary color lights, mixed light of the first and third primary color lights, and mixed light of the first, second, and third primary color lights constituting light of all colors are successively transmitted in a constant repeated sequence, in the electron beam scanning direction.

5 Claims, 15 Drawing Figures

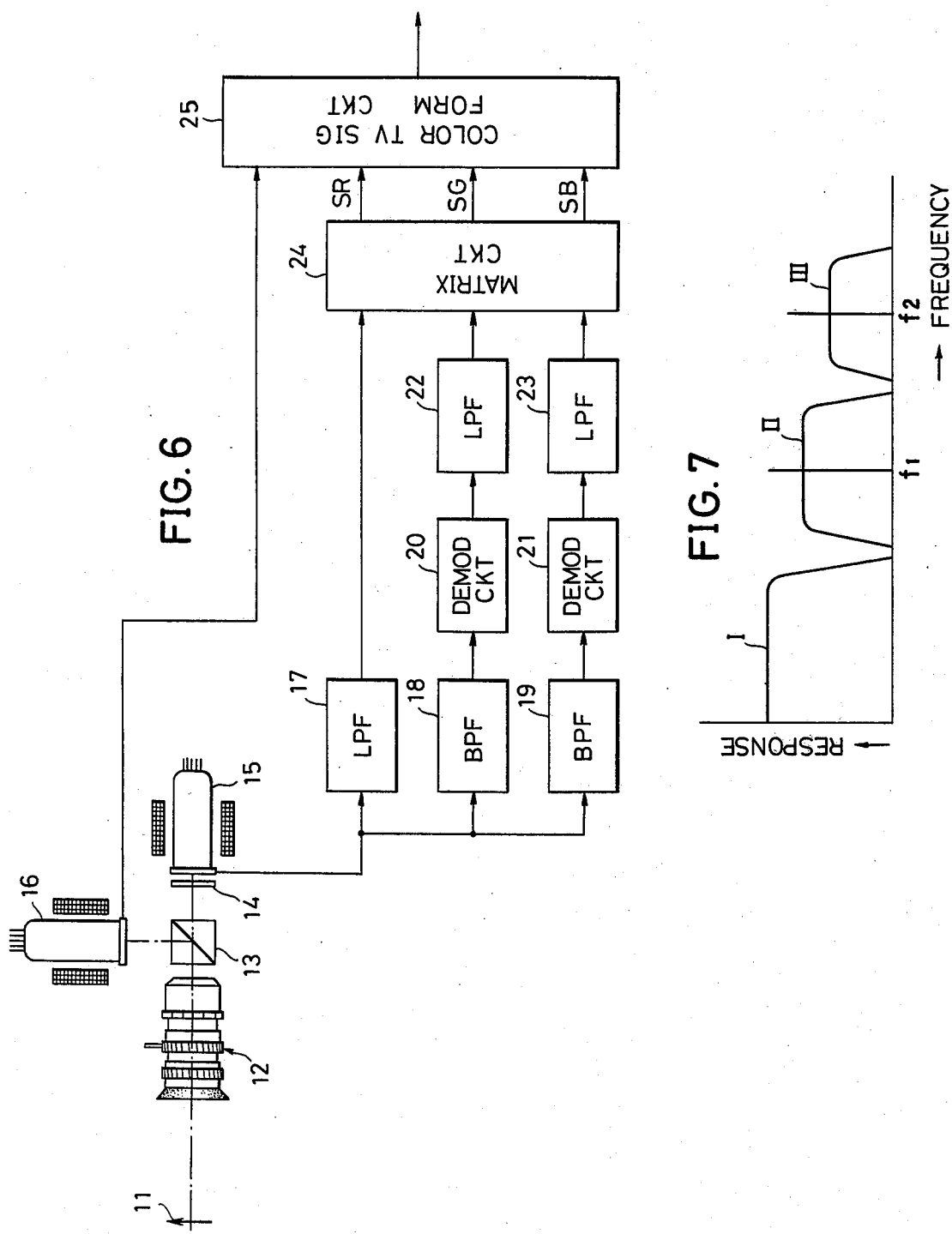

| X → | W<br>Z1 | M<br>Z2 | C<br>Z3 | B<br>Z4 | Z5 | Z6 | Z7 | Z8 | Z9 | 14c<br>Z10 | Z11 | Z12 |
|---|---|---|---|---|---|---|---|---|---|---|---|---|
| 50a → | M | | B | | M | | B | | M | | B | |
| 51a → | G | R | G | O | G | R | G | O | G | R | G | O |
| 50b → | M | | B | | M | | B | | M | | B | |
| 51b → | G | R | G | O | G | R | G | O | G | R | G | O |
| 50c → | M | | B | | M | | B | | M | | B | |
| 51c → | G | R | G | O | G | R | G | O | G | R | G | O |
| 50d → | M | | B | | M | | B | | M | | B | |
| 51d → | G | R | G | O | G | R | G | O | G | R | G | O |
| 50e → | M | | B | | M | | B | | M | | B | |
| 51e → | G | R | G | O | G | R | G | O | G | R | G | O |

Y ↓

COLOR TELEVISION CAMERA

BACKGROUND OF THE INVENTION

This invention relates generally to a color television camera and more particularly to an improvement in a color-resolving striped filter for use in a color television camera. The camera has a two-tube type of a luminance-separation system, having one camera pick-up tube for luminance signals and one camera pickup tube for color signals.

In general, a color television camera of the two-tube type, of the above mentioned luminance-separation system, has a color-resolving striped filter (hereinafter called a striped filter). This filter is in the optical system of the camera tube for color signals. Color signals are derived by a frequency-separation system or a phase-separation system.

In a color television system, as is well known, the chromaticities of the image-receiving three primary colors are so determined that the chromaticity ranges which can be reproduced will be made as wide as possible, with due consideration given to other conditions. Accordingly, the spectral sensitivity or response (image-pickup characteristic) of a color television camera is made to approximate, as closely as possible, the above mentioned image-receiving three primary colors.

In a so-called three-tube color television camera, it is relatively easy to obtain the above mentioned required image-pickup characteristic. However, in a two-tube color television camera with a striped filter, the image-pickup characteristic departs remarkably from the ideal image-pickup characteristic.

That is, a striped filter transmits the light of subtractive primaries (corresponding to the light resulting from the mixing of two primary colors out of three additive primaries). For example, it is not possible, at the present stage of the art of optical filters, to obtain an ideal characteristic curve of wavelength versus relative response, with respect to each of the lights resulting from the additive mixture of two primary colors of the three primaries red (R), green (G), and blue (B), such as, for example, cyan light, magenta light, and yellow light.

As a consequence, the primary colors are extracted from signals such as signals based on the light of all colors or the signals based on the light of the various mixed colors. The signals are extracted in the matrix circuit of a color television camera. An error arises as a result of a difference between the ideal characteristic and the characteristic of the actual filter produced in accordance with the present art. Color turbidity is produced in the image-pickup picture. Furthermore, there are deviations in the characteristics of the manufactured filters of the same type and differences in their transmissible characteristics, which also cause color turbidity in the pickup picture.

SUMMARY OF THE INVENTION

It is a general object of the present invention to provide a novel and useful color television camera in which the above described difficulties of the prior art have been overcome.

A specific object of the invention to provide a color television camera which is capable of picking up images without color turbidity in the picked-up picture responsive to use of a striped filter in the optical system of a chrominance camera tube.

Another object of the invention is to provide a color television camera using a striped filter for respectively transmitting only one of the three primary colors. The filter does not transmit additive color mixture light or, if used, they occupy only a very small portion. By this provision in the color television camera of this invention, it is possible to obtain excellently picked-up color television signals which are not without color turbidity due to differences in filter characteristics.

Still another object of the invention is to provide a color television camera having a striped filter in front of a camera tube. An arrangement of the filter portions is capable of generating additive color mixtures. This filter extends in a direction perpendicular to the direction of scanning of an electron beam over the pickup surface of the camera tube.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 6 is a schematic block diagram showing the essential organization of one embodiment of a color television camera according to the present invention;

FIG. 7 is a graph indicating the frequency-response characteristic of the output signal of the camera tube for chrominance signals in the camera illustrated in FIG. 6;

DETAILED DESCRIPTION

Figure 1:
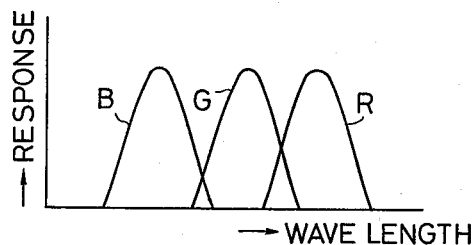
FIG. 1 is a graph indicating the wavelength versus relative response characteristics of the three primary colors.

First, the reason for the occurrence of color turbidity in the picked-up picture is due to characteristic difference as mentioned above. In general, the wavelength versus relative response characteristics of the three primary colors of red (R), green (G), and blue (B) are as indicated in FIG. 1.

Figure 2A:
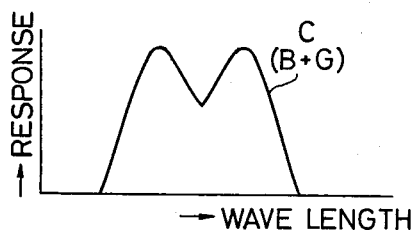
FIGS. 2A and 2B are graphs respectively indicating the wavelength versus relative response characteristics of an ideal filter and an actual filter with respect to cyan light.
Figure 2B:
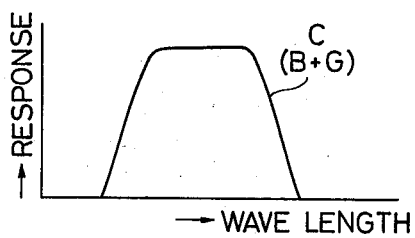
Figure 3A:
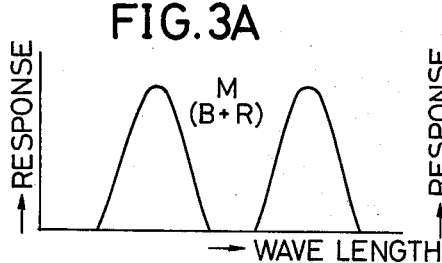
FIGS. 3A and 3B are graphs respectively indicating the wavelength versus relative response characteristics of an ideal filter and an actual filter with respect to magenta light.
Figure 3B:
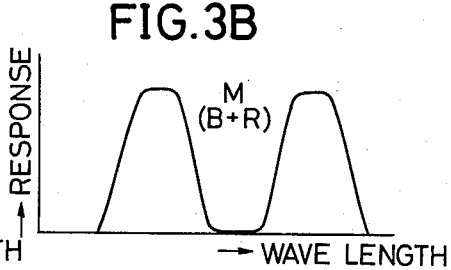
Figure 4A:
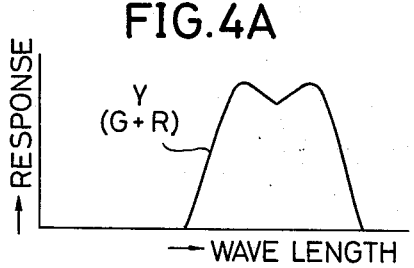
FIGS. 4A and 4B are graphs respectively indicating the wavelength versus relative response characteristics of an ideal filter and an actual filter with respect to yellow light.
Figure 4B:
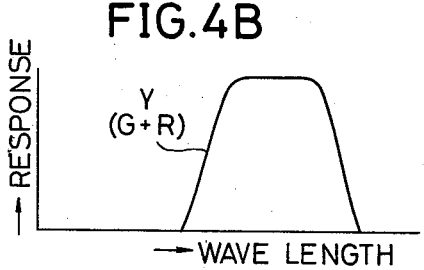
Figure 5A:
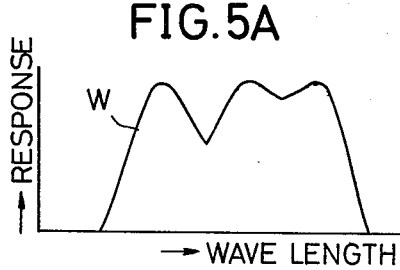
FIGS. 5A and 5B are graphs respectively indicating the wavelength versus relative response characteristics of an ideal filter and an actual filter with respect to light of all colors (white light)
Figure 5B:
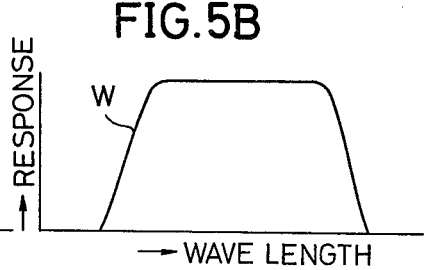

Then, the characteristic of a filter for transmitting a light results from mixing two primary color lights out of the above mentioned three primary colors by the additive color mixing method is as follows. The characteristic of an ideal filter passing cyan light (C), which is a color mixture light of blue light (B) and green light (G), is as indicated by curve C in FIG. 2A. This is equal to the additive combination of curves B and G in FIG. 1. Similarly, the characteristic of an ideal filter passing magenta light (M), which is a color mixture light of blue light (B) and red light (R), is as indicated by curve M in FIG. 3A, which is equal to the sum of curves B and R in FIG. 1. Furthermore, the characterstic of an ideal filter passing yellow light (Y), which is a color mixture light of green light (G) and red light (R), is as indicated by curve Y in FIG. 4A, which is equal to the sum of curves G and R in FIG. 1. In addition, the characteristic of an ideal filter transmitting light of all colors (white light) (W), is as indicated by curve W in FIG. 5A, which is the sum of curves R and G in FIG. 1.

The characteristics of optical filters manufactured in accordance with the present invention, however, cannot be made to match the ideal characteristics indicated in FIGS. 2A through 5A. More specifically, the wavelength versus relative response characteristic curves of filters for cyan light, magenta light, yellow light, and white light become as indicated respectively in FIGS. 2B, 3B, 4B, and 5B. As is apparent from a comparison between the characteristic curves of these filters and of the ideal filters as shown in FIGS. 2A, 3A, 4A, and 5A, respectively, there is a difference from their respective ideal characteristic curves.

Consequently, when primary color signals are derived from signals based on white light and signals based on color mixture lights in the matrix circuit, errors occur in accordance with differences between the characterstics of ideal filters as indicated in FIGS. 2A through 5A. The characteristics of actual filters as indicated in FIGS. 2B through 5B are produced, and color turbidity occurs in the picked-up picture. Furthermore, during the manufacture of filters of the same type, deviations develop in the characteristics thereof. In addition, there are differences in the light transmission of filters of different types. These deviations and differences are also causes of color turbidity in the picked-up picture.

The above described problems have been overcome by the present invention, as described below, with respect to one embodiment of a color television camera according to the invention as illustrated in FIG. 6.

Light from an object 11 passes through a camera lens system 12 and a half mirror (or prism) 13 for division of the light path. One portion of the light passes through a striped filter 14 described hereinafter in detail. Then the light reaches the pickup surface of a camera tube 15 for chrominance signals. The remainder portion of the light reaches the pickup surface of a camera tube 16 for luminance signals.

The resulting output signal of the camera tube 15 is supplied to each of a low-pass filter 17 and band-pass filters 18 and 19. From the low-pass filter 17, a direct signal, of a characteristic as indicated by curve I in FIG. 7 is obtained and supplied to a matrix circuit 24. The direct signal comprises, for example, a blue light signal SB, one half of a red light signal SR, and one half of a green light signal SG. Band-pass filter 18 produces a first modulated color signal, in which a carrier wave of a frequency $f_1$ is amplitude modulated by a specific color signal (for example, red light signal SR). This modulated color signal has a characteristic as indicated by curve II. The band-pass filter 19 produces a second modulated color signal in which a carrier wave of a frequency $f_2$ is amplitude modulated by a specific color signal (for example, green light signal SG). It has a characteristic as indicated by curve III.

The first modulated color signal from the band-pass filter 18 is demodulated by a demodulation circuit 20. After passing through a low-pass filter, 22 and being limited in band, the demodulated signal is fed to the above mentioned matrix circuit 24. Furthermore, the second modulated color signal from the band-pass filter 19 is demodulated by a demodulation circuit 21. After passng through a low-pass filter 23 and being limited in band, it is supplied to the matrix circuit 24.

The output signals from the low-pass filters 17, 22, and 23 are matrixed by the matrix circuit 24 in the known manner. Signals SR, SG, and SB, of the three primary colors, are derived from the matrix circuit 24 and supplied to a color television signal forming circuit 25. On the other hand, the resulting luminance signal from the camera tube 16 for luminance signals is also supplied to the color television signal forming circuit 25. From there, the color television signals are obtained. The detailed description of the operation of the block diagram of FIG. 6 is given in U.S. Pat. No. 3,808,357.

Next, the striped filter 14, constituting an important component of the present invention, will be described with respect to specific embodiments thereof.

Figure 8:
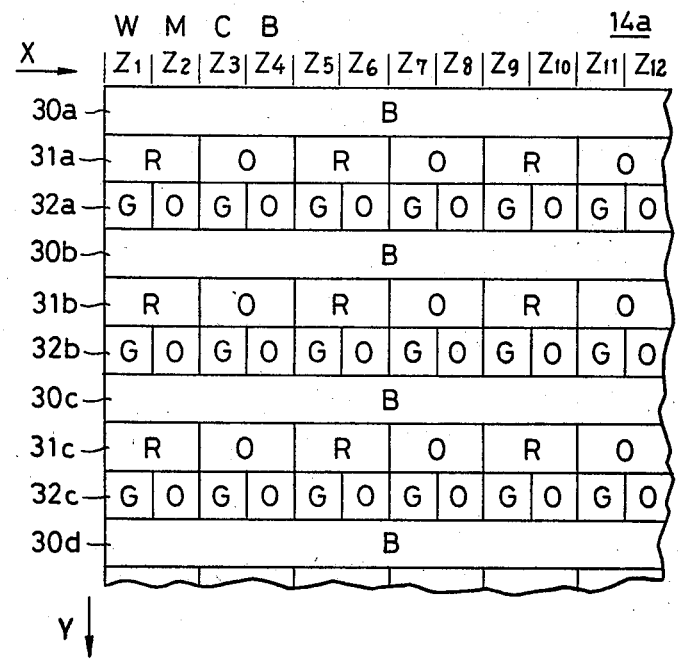
FIG. 8 is a fragmentary pattern diagram showing a first embodiment of a striped filter constituting an important component of the invention.

The pattern of a striped filter 14a is shown in FIG. 8, as a first embodiment of this striped filter 14. Narrow stripes $30a, 30b, 30c, \ldots (30)$ are filters transmitting only blue light (B) and extend in the arrow direction X, with zero space frequency (i.e., in a substantially continuous manner). Narrow stripes $31a, 31b, 31c, \ldots (31)$ comprise filter parts R for passing red light (R), and opaque parts O which are arranged alternately in the arrow direction X, with a constantly repeated sequence and with a first specific space frequency $f_1$. Narrow stripes $32a, 32b, 32c, \ldots (32)$ comprise filter parts G for passing green light (G), and opaque parts O which are arranged alternately in the arrow direction X, with a constantly repeated sequence and with a second specific space frequency $f_2$ ($2f_1$). Furthermore, narrow stripes 30, 31, and 32 are respectively arranged in a row in a constantly repeated sequence as stripes $30a, 31a, 32a, 30b, 31b, 32b, \ldots$ in the arrow direction Y perpendicular to the arrow direction X.

The striped filter will now be considered as being marked off in the arrow direction Y into regions Z1, Z2, Z3, ......... corresponding to the repeated parts of the stripe 32. Then, if light of all colors is projected onto the entire filter, blue light (B), red light (R), and green light (G) are passed at the region Z1. That is, as a resultant effect, the light of all colors (white light) (W) is transmitted. At the region Z2, blue light (B) and red light (R) are passed. As a resultant effect, magenta light (M) is transmitted. At the region Z3, blue light (B) and green light (G) are passed. As a resultant effect, cyan light (C) is transmitted. At the region Z4, only blue light (B) is transmitted. At successive regions Z5, Z6, Z7, Z8, ........., similarly as at the regions Z1 through Z4, white light (W), magenta light (M), cyan light (C), and blue light (B) are transmitted in repeated sequence.

Accordingly, the striped filter 14a illustrated in FIG. 8 is used for the striped filter 14 in FIG. 6. Simultaneously an electron beam scans the part covered by the stripes 30, 31, and 32 of the same subscript (e.g., 30a, 31a, and 32a), as one group in the image pickup surface of the camera tube 15 on which an image has been formed as a result of transmission of light through this striped filter. The light image of the object 11 to be picked up is derived as signals resolved into white light (W), magenta light (M), cyan light (C), and blue light (B) from the camera tube 15.

By the use of the striped filter 14a in this manner, all of the filter parts of all filter stripes are formed by the use of only filters passing respectively three primary colors. A color mixture light passing filter is not used. Accordingly, the invention overcomes the problem caused by the difference between the characteristics of the ideal filter and actual filter, which occurs if a color mixture light passing filter is used, as described hereinbefore in conjunction with FIGS. 2A through 5B. As a result, an excellent image pickup picture can be obtained without color turbidity.

In the instant embodiment, the blue light filter part B, the red light filter part R, and the green light filter part G may be mutually exchanged.

Figure 9:
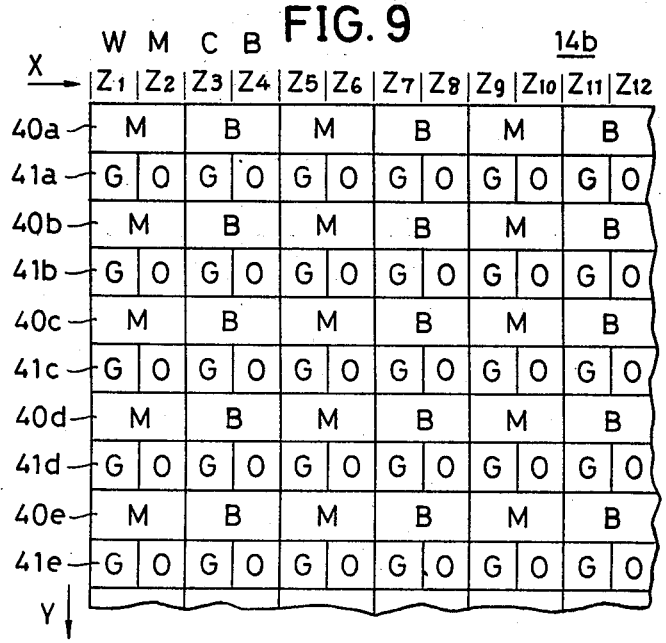
FIG. 9 is a fragmentary pattern diagram of a second embodiment of the striped filter of the invention.

In a second embodiment 14b of the striped filter 14, a pattern as shown in FIG. 9 is used. Narrow stripes 40a, 40b, 40c, ............ (40) have filter parts M for transmitting magenta light (M) and filter parts B for transmitting blue light (B). The filter parts M and B are alternately arranged in the arrow direction X in a constantly repeated sequence, with a first specific space frequency $f_1$. Narrow stripes 41a, 41b, 41c, ....., (41) have filter parts G for transmitting green light (G) and opaque parts O, alternately arranged in the arrow direction X in a constantly repeated sequence with a second specific space frequency $f_2$. Furthermore, the stripes 40 and 41 are alternately arranged in a row in the arrow direction Y as 40a, 41a, 40b, 41b, .......... in a constantly repeated sequence.

The striped filter will now be considered as being marked off into region Z1, Z2, Z3, .......... corresponding to the repeated parts of the stripes 41. Then, if light of all colors is projected onto the entire filter, magenta light (M) and green light (G) are passed at the region Z1, and, as a resultant effect, white light (W) is transmitted. At the region Z2, only magenta light (M) is transmitted. At the region Z3, blue light (B) and green light (G) are passed, and, as a resultant effect, cyan light (C) is transmitted. At the region Z4, only blue light (B) is transmitted. At successive regions Z5, Z6, Z7, Z8, ......, similarly as at the regions Z1 through Z4, white light (W), magenta light (M), cyan light (C), and blue light (B) are transmitted, in this repeated sequence.

In the instant embodiment, a filter part of magenta light (M) of mixed light is used in one part of the stripes 40. However, this mixed color light passing filter part is only one part of the entire filter. In actual practice, there is almost no effect of error in the filter characteristic. On one hand, only two kinds of stripes, namely, stripes 40 and stripes 41, are needed. It is sufficient for the electron beam to scan only two stripes 40 and 41 simultaneously. Accordingly, if the diameter of the electron beam is the same as that in the preceding embodiment, the widths of the stripes 40 and 41 can be made wider than the widths of the stripes in the preceding embodiment, thereby advantageously facilitating the fabrication of the filter.

Figures 10, 11:
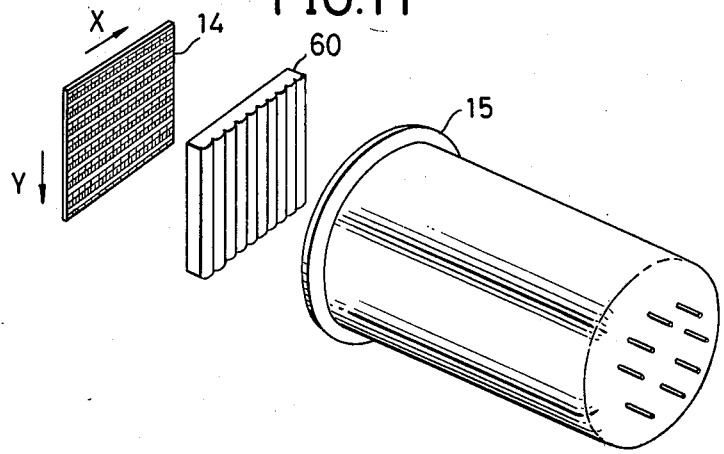
FIG. 10 is a fragmentary pattern diagram showing a third embodiment of the striped filter of the invention.
FIG. 11 is a perspective view showing the state of combination for use of a striped filter and a lenticular lens.

A third embodiment 14c of the striped filter 14 has a filter pattern as shown in FIG. 10. Narrow stripes 50a, 50b, 50c, ...... (50) have regions, of which four consecutive regions (Z1 through Z4, Z5 through Z8, ........) are taken to constitute one unit. A specific region (Z1, Z5, Z9, ......) in each unit is a filter part M, adapted to transmit magenta light (M). The remaining three regions (Z2 through Z4, Z6 through Z8, .....) in each unit are filter parts B, adapted to transmit blue light (B). Narrow stripes 51a, 51b, 51c, ... (51) have corresponding regions, of which those of odd number (Z1, Z3, Z5, .....) comprise filter parts G, which are adapted to transmit green light (G). Those of even number (Z2, Z4, Z6,......) comprise filter parts R adapted to transmit red light (R). Thus, color filters and the opaque filter parts O are arranged in an alternately repeating pattern.

Then, if light of all colors is projected onto the entire filter, magenta light (M) and green light (G) is passed at the region Z1, and, as a resultant effect, white light (W) is transmitted. At the region Z2, blue light (B) and red light (R) are passed, and, as a resultant effect, magenta light (M) is transmitted. At the region Z3, blue light (B) and green light (G) are passed, and, as a resultant effect, cyan light (C) is transmitted. At the region Z4, only blue light (B) is transmitted. Thus, in the successive regions, white light (W), magenta light (M), cyan light (C), and blue light (B) are transmitted in this repeated sequence.

Since this third embodiment of the striped filter 14 required only two kinds of stripes, namely, 50 and 51, it has the advantages of the preceding second embodiment. Moreover, it has a further advantage, since only one region out of each unit of four regions is required to be a filter part M for transmitting magenta light (M) as a mixed color light. The mixed color filter parts are therefore few, and the effects of filter characteristic error are less than in the second embodiment.

An example of the use of the striped filter 14 in combination with a lenticular lends is shown in FIG. 11. The striped filter 14 (14a, 14b, or 14c) is disposed in front of the camera tube 15 with an orientation such that the stripes extend in the X direction. That is, the rows of regions Z1, Z2, ....... extend in the Y direction. A lenticular lens 60 is interposed between the striped filter 14 and the face plate of the camera tube 15, with an orientation such that its plurality of cylindrical lens parts extending in parallel in the Y direction are arranged side-by-side in the X direction.

By this arrangement, the optical images of the stripes of the striped filter 14 respectively form a sharp image on the target surface of the camera tube 15 with respect to the X direction and, with respect to the Y direction. The optical images assume a state similar to that wherein an optical low-pass filter is inserted. Consequently, the light transmitted through the stripes of all groups form an image on the target surface in a state wherein they are mixed by additive color mixing with respect to the Y direction. As a result, when this target surface is scanned by an electron beam, signals of light resolved into white light (W), magenta light (M), cyan light (C), and blue light (B) are derived as described hereinbefore.

Further, this invention is not limited to these embodiments but various variations and modifications may be made without departing from the scope and spirit of the invention.

What is claimed is:

1. A color television camera comprising:
   a camera tube for chrominance signal;
   a color-resolving striped filter disposed in the optical path of said camera tube, said color-resolving striped filter comprising a plurality of groups of filter stripes, each of said groups comprising a plurality of different kinds of said filter stripes which respectively extend in a specific direction, said stripes being arranged in a predetermined sequence along a line which is perpendicular to the specific direction, and at least two of said filter stripes transmitting two of said primary colors with different spatial frequencies in the specific direction;
   means for causing an electron beam in said camera tube to scan simultaneously over the filter stripes in each group in parallel with the specific direction to produce chrominance signals in response to the light of an optical image passing through said striped filter;
   low-pass filter means responsive to the chrominance signals for separating direct wave signals representing a sum of first, second and third primary color light signals of a specific ratio;
   first band-pass filter means responsive to the chrominance signals for separating a first modulated color signal in which a carrier wave of a first frequency is amplitude-modulated with the second primary color light signal;
   second band-pass filter means responsive to the chrominance signals for separating a second modulated color signal in which a carrier wave of a second frequency is amplitude-modulated with the third primary color light signal; and
   means for demodulating the first and second modulated color signals and matrixing them with the direct wave signals to derive three primary color signals.

2. A color television camera as claimed in claim 1 in which three of said stripes respectively forming first, second, and third kinds of said stripes constitute each group, the entire filter stripe of the first kind comprising a filter for transmitting the first primary color light; the filter stripes of the second kind comprising, in repeated alternate sequence, with a first space frequency, filters for transmitting the second primary color light and opaque parts; and the filter stripes of the third kind comprising, in repeated alternate sequence, with a second space frequency, filters for transmitting the third primary color light and opaque parts.

3. A color television camera as claimed in claim 1 in which said color-resolving striped filter comprises a plurality of groups of filter stripes, two stripes respectively of said first and second kinds constituting each group; the filter stripes of the first kind comprising, in repeated alternate sequence, with a first space frequency, filters for transmitting a color mixture light of the first and second primary color lights and filters for transmitting the first primary color light; the filter stripe of the second kind comprising, in alternate repeated sequence with a second space frequency, filters for transmitting the third primary color light and opaque parts.

4. A color television camera as claimed in claim 1 in which said color-resolving striped filter comprises a plurality of groups of filter stripes, two filter stripes respective of said first and second kinds constituting each group; the filter stripes of the first kind comprising in alternate sequence filters for transmitting a color mixture light of the first and second primary color lights and filters for transmitting the first primary color light; the filter stripe of the second kind comprising, in repeated alternate sequence with a specific space frequency, filters for transmitting the third primary color light, filters for transmitting the second primary color light, filters for transmitting the third primary color light, and opaque parts; said filters for transmitting the color mixture light of the first kind of filter stripes corresponding to the filters for transmitting the third primary color light of the second kind of filter stripes, said filters for transmitting the first primary color light of the first kind of filter stripes corresponding to the filters for transmitting the second primary color light of the second kind of filter stripes, other filters for transmitting the third primary color light, and opaque parts.

5. A color television camera as claimed in claim 1 which further comprises a lenticular lens interposed between said color-resolving striped filter and said camera tube, and said lenticular lens comprising a plurality of cylindrical lens parts with their respective axial directions extending perpendicular to the direction in which the filter stripes extend, said lens parts being mutually parallel in a row in the direction of extension of the filter stripes.

* * * * *